(12) United States Patent
Roman et al.

(10) Patent No.: US 12,442,783 B2
(45) Date of Patent: Oct. 14, 2025

(54) ADDITIVE MANUFACTURED PERMANENT MAGNETS IN MAGNETO STRICTIVE OSCILLATING ICE DETECTOR SENSORS

(71) Applicant: Rosemount Aerospace Inc., Burnsville, MN (US)

(72) Inventors: Jamison K. Roman, Elko, MN (US); Matthew Webb, Lakeville, MN (US)

(73) Assignee: Rosemount Aerospace Inc., Burnsville, MN (US)

( * ) Notice: Subject to any disclaimer, the term of this patent is extended or adjusted under 35 U.S.C. 154(b) by 177 days.

(21) Appl. No.: 18/200,213

(22) Filed: May 22, 2023

(65) Prior Publication Data

US 2024/0393274 A1 Nov. 28, 2024

(51) Int. Cl.
| | |
|---|---|
| G01N 27/02 | (2006.01) |
| B33Y 10/00 | (2015.01) |
| B33Y 40/20 | (2020.01) |
| B33Y 80/00 | (2015.01) |
| G01N 29/12 | (2006.01) |

(52) U.S. Cl.
CPC ............ *G01N 27/025* (2013.01); *B33Y 10/00* (2014.12); *B33Y 40/20* (2020.01); *B33Y 80/00* (2014.12); *G01N 29/12* (2013.01); *G01N 2291/0251* (2013.01)

(58) Field of Classification Search
CPC ......... G01N 27/025; G01N 2291/0251; G01N 29/12; G01N 29/2412; B33Y 40/20; B33Y 80/00; B33Y 10/00; H10N 35/101; H10N 35/80; G01P 5/165; B64D 15/20
USPC ........................................................ 324/654
See application file for complete search history.

(56) References Cited

U.S. PATENT DOCUMENTS

| | | | |
|---|---|---|---|
| 9,970,824 B2 | 5/2018 | Cheung et al. | |
| 11,131,685 B2 | 9/2021 | Tillotson | |
| 2005/0172712 A1* | 8/2005 | Nyce ..................... | G01F 23/268 |
| | | | 73/304 C |
| 2008/0052932 A1* | 3/2008 | Xue ........................ | G01C 17/28 |
| | | | 33/356 |
| 2013/0300401 A1* | 11/2013 | Krapf ..................... | G01V 3/107 |
| | | | 324/201 |
| 2017/0269036 A1* | 9/2017 | Foord .................. | G01N 27/023 |

(Continued)

FOREIGN PATENT DOCUMENTS

| | | |
|---|---|---|
| EP | 4301118 A1 | 1/2024 |
| KR | 101964981 B1 | 8/2019 |

OTHER PUBLICATIONS

European Patent Office, Extended European Search Report received in EP Application No. 24176981.9, Sep. 19, 2024, 8 pages.

*Primary Examiner* — Raul J Rios Russo
(74) *Attorney, Agent, or Firm* — Suiter Swantz IP

(57) ABSTRACT

An ice detection sensor apparatus includes a strut body extending along a longitudinal axis. The strut body includes an axially extending wall extending around the longitudinal axis to surround an interior space, and an axial-facing end wall connected to an axial end of the axially extending wall. The axial-facing end wall partially bounds the interior space. A magneto strictive oscillator sensing element extends from the interior space, through the axial-facing end wall. The sensing element is engaged to the axial-facing end wall for oscillation along the longitudinal axis relative to the axial-facing end wall. A permanent magnet (PMG) element is integral with, e.g., monolithic with, the strut body.

14 Claims, 4 Drawing Sheets

(56) References Cited

U.S. PATENT DOCUMENTS

| | | |
|---|---|---|
| 2020/0408670 A1* | 12/2020 | Goodwin .............. G01N 17/04 |
| 2021/0048465 A1* | 2/2021 | Anderson .......... G01R 29/0878 |
| 2022/0196600 A1 | 6/2022 | Veilleux, Jr. et al. |
| 2022/0381627 A1 | 12/2022 | Kim |

* cited by examiner

ADDITIVE MANUFACTURED PERMANENT MAGNETS IN MAGNETO STRICTIVE OSCILLATING ICE DETECTOR SENSORS

BACKGROUND

1. Field

The present disclosure relates to ice detection sensors, and more particularly to ice detection sensors with magneto strictive oscillating configurations.

2. Description of Related Art

Traditional magneto strictive oscillator ice detector sensors utilize a permanent magnet (PMG) as part of the system operation to induce a static field bias. The strength and uniformity of the permanent magnet affect the oscillation of the sensing element. The sensing element oscillates position, driven by a drive coil. The system monitors the oscillations, and changes in the oscillation are indicative of changes in icing on the sensor.

The conventional techniques have been considered satisfactory for their intended purpose. However, there is an ever present need for improved systems and methods for magneto strictive oscillator ice detector sensors. This disclosure provides a solution for this need.

SUMMARY

An ice detection sensor apparatus includes a strut body extending along a longitudinal axis. The strut body includes an axially extending wall extending around the longitudinal axis to surround an interior space, and an axial-facing end wall connected to an axial end of the axially extending wall. The axial-facing end wall partially bounds the interior space. A magneto strictive oscillator sensing element extends from the interior space, through the axial-facing end wall. The sensing element is engaged to the axial-facing end wall for oscillation along the longitudinal axis relative to the axial-facing end wall. An oscillation driver within the interior space is operatively connected to the sensing element to drive oscillation of the sensing element. An oscillation detector within the interior space is operatively connected to detect oscillation of the sensing element for ice detection. A permanent magnet (PMG) element is integral with, e.g., monolithic with, the strut body.

The PMG element can include a PMG that is ring shaped, is concentric with the sensing element, and extends along a majority of an axial length of the sensing element. It is also contemplated that the PMG element can include at least one of: a first permanent magnet (PMG) that is lateral from the sensing element relative to the longitudinal axis, and a second PMG that is concentric with the sensing element relative to the longitudinal axis. The first PMG can extend along a greater axial extent of the sensing element than does the second PMG. The first PMG can be cylindrical and can extend longitudinally parallel to the longitudinal axis. The second PMG can be in an annular cylinder shape axially aligned and concentric with the sensing element. The strut can be of aluminum. The first PMG and the second PMG can be of rare earth magnetic material.

A spring can be operatively connected to an end of the sensing element inside the interior space. The spring can be configured to bias the sensing element during oscillations of the sensing element. A base can be connected to the strut and can enclose the interior space in cooperation with the axially extending wall and with the axially-facing end wall. The base can house a controller operatively connected to the oscillation driver and to the oscillation detector for detecting ice formation on the sensing element and outputting data indicative of icing state of the sensing element.

A method of making an ice detection sensor apparatus includes additively manufacturing a strut of a base material with an integrated permanent magnet (PMG) element. The base material and PMG element are formed together layer by layer. The method includes assembling a magneto strictive oscillator sensing element, an oscillation driver operatively connected to the sensing element to drive oscillation of the sensing element, and an oscillation detector operatively connected to detect oscillation of the sensing element for ice detection in an interior space of the strut with a portion of the sensing element extending through the strut to a space exterior of the strut.

In forming the base material and PMG element layer by layer, at least some layers can include both PMG material and the base material together in the same layer. The base material can be a non-ferromagnetic metal. The base material can be aluminum.

These and other features of the systems and methods of the subject disclosure will become more readily apparent to those skilled in the art from the following detailed description of the preferred embodiments taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, preferred embodiments thereof will be described in detail herein below with reference to certain figures, wherein.

DETAILED DESCRIPTION OF THE PREFERRED EMBODIMENTS

Figure 1:
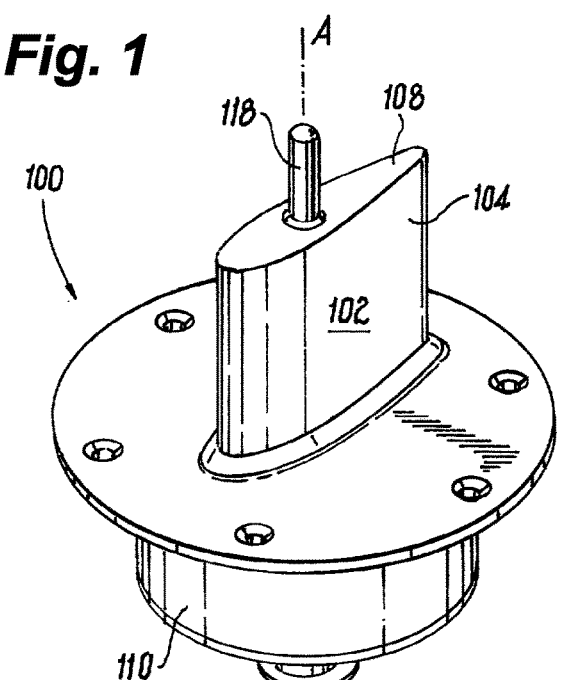
FIG. 1 is a schematic perspective view of an embodiment of an ice detection sensor apparatus constructed in accordance with the present disclosure, showing the base, the strut, and the sensing element extending from the strut.

Reference will now be made to the drawings wherein like reference numerals identify similar structural features or aspects of the subject disclosure. For purposes of explanation and illustration, and not limitation, a partial view of an embodiment of an apparatus in accordance with the disclosure is shown in FIG. 1 and is designated generally by reference character 100. Other embodiments of systems in accordance with the disclosure, or aspects thereof, are provided in FIGS. 2-5, as will be described. The systems and methods described herein can be used to provide improved permanent magnet (PMG) fields in magneto strictive ice detection sensors relative to traditional configurations.

An ice detection sensor apparatus 100 includes a strut body 102 extending along a longitudinal axis A. The strut body 102 includes an axially extending wall 104 extending around the longitudinal axis A to surround an interior space 106 (labeled in FIG. 2), and an axial-facing end wall 108 connected to an axial end of the axially extending wall 104. A base 110 is connected to the strut 102 and encloses the interior space 106 (labeled in FIG. 2) in cooperation with the axially extending wall 104 and with the axially-facing end wall 108.

Figure 2:
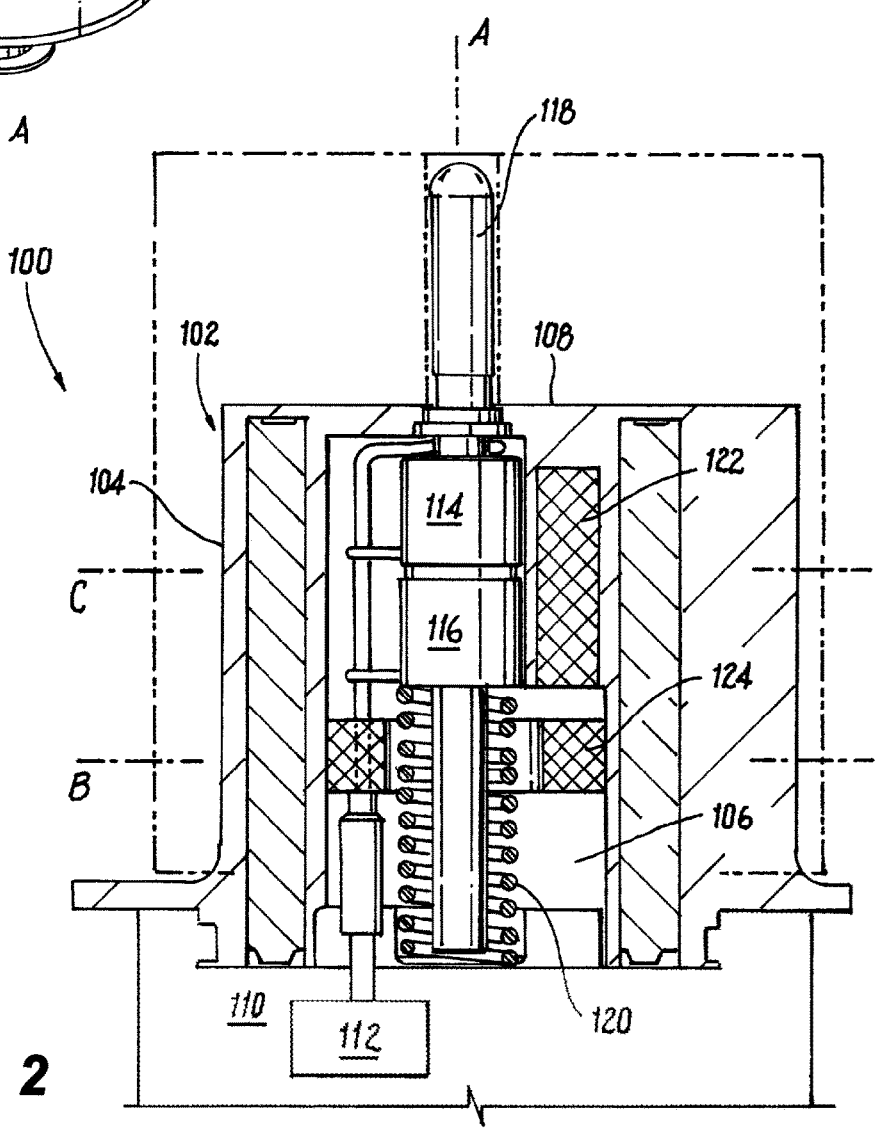
FIG. 2 is a cross-sectional side elevation schematic view of a portion of the apparatus of FIG. 1, showing the permanent magnets (PMGs) integral with the strut.

With reference now to FIG. 2, a magneto strictive oscillator sensing element 118 extends from the interior space 106, through the axial-facing end wall 108. The sensing element 118 is engaged to the axial-facing end wall 108 for oscillation along the longitudinal axis A relative to the axial-facing end wall 108. A spring 120 is operatively connected to an end of the drive and feedback coils 114, 116 inside the interior space 106. The spring 120 is configured to restrain the location of drive and feedback coils 114, 116 during oscillations of the sensing element 118. An oscillation driver or drive coil 114, e.g. including an electromagnetic coil, piezoresistive actuators, or the like, is housed within the interior space 106 and is operatively connected to the sensing element 118 to drive oscillation of the sensing element 118. An oscillation detector or feedback coil 116 within the interior space is operatively connected to detect oscillation of the sensing element 118 for ice detection, i.e. the frequency of oscillation changes depending on how much ice is accreted on the exterior portion of the sending element 118. The base 110 houses a controller 112 operatively connected to the oscillation driver 114 and to the oscillation detector 116 for detecting ice formation exterior on the sensing element 118 and outputting data indicative of icing state of the sensing element 118, e.g. for use by pilots, autopilots, avionics, and the like.

With continued reference to FIG. 2, a first permanent magnet (PMG) 122 is lateral from the sensing element 118 relative to the longitudinal axis A. A second PMG 124 is concentric with the sensing element 118 relative to the longitudinal axis A. While shown and described as being used together, those skilled in the art will readily appreciate that it is not necessary to include both PMGs 122 and 124. The axially extending wall 104, the axially-facing end wall 108, the first PMG 122, and the second PMG 124 are all monolithic with one another. The first PMG 122 extends along a greater axial extent of the sensing element 118 than does the second PMG 124, to provide a static biasing magnetic field 123, labeled in FIG. 3, with long coupling length to the sensing element 118. The first PMG 122 is cylindrical and extends longitudinally parallel to the longitudinal axis A. The second PMG 124 is in an annular cylinder shape, axially aligned and concentric with the sensing element for a component of radially uniform field 125, labeled in FIG. 3, in the static magnetic field for biasing the sensing element 118 relative to the axis A. The strut 104 can be made of a non-ferromagnetic material such as aluminum. The first and second PMGs 122, 124 are of rare earth magnetic material or of any other suitable magnetic material. As shown in FIG. 4, it is also contemplated that a single PMG 127 can be used that is ring shaped, concentric with the sensing element 118, and extends along a majority of the axial length of the sensing element 118, with a long, radially uniform magnetic field 129.

Figure 3:
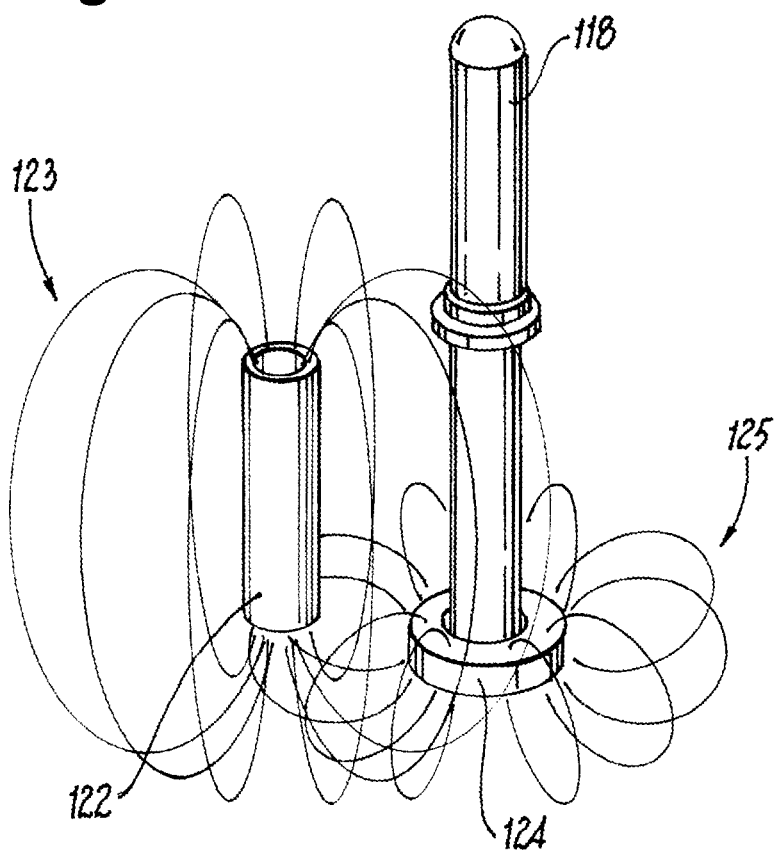
FIG. 3 is a schematic perspective view of a portion of the apparatus of FIG. 1, showing magnetic fields for the PMGs relative to the sensing element.
Figure 4:
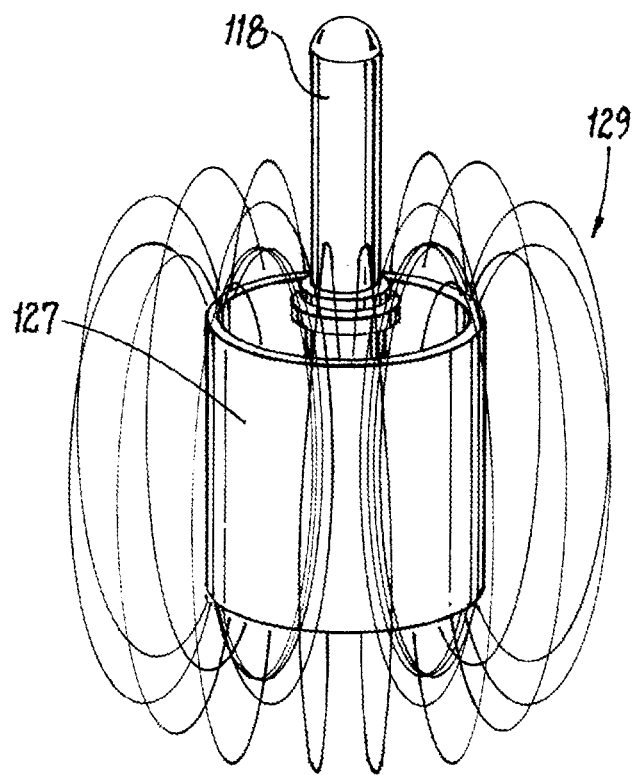
FIG. 4 is a schematic perspective view of a portion of the apparatus of FIG. 1, showing a single PMG configuration with a long, radially uniform magnetic field.
Figure 5:
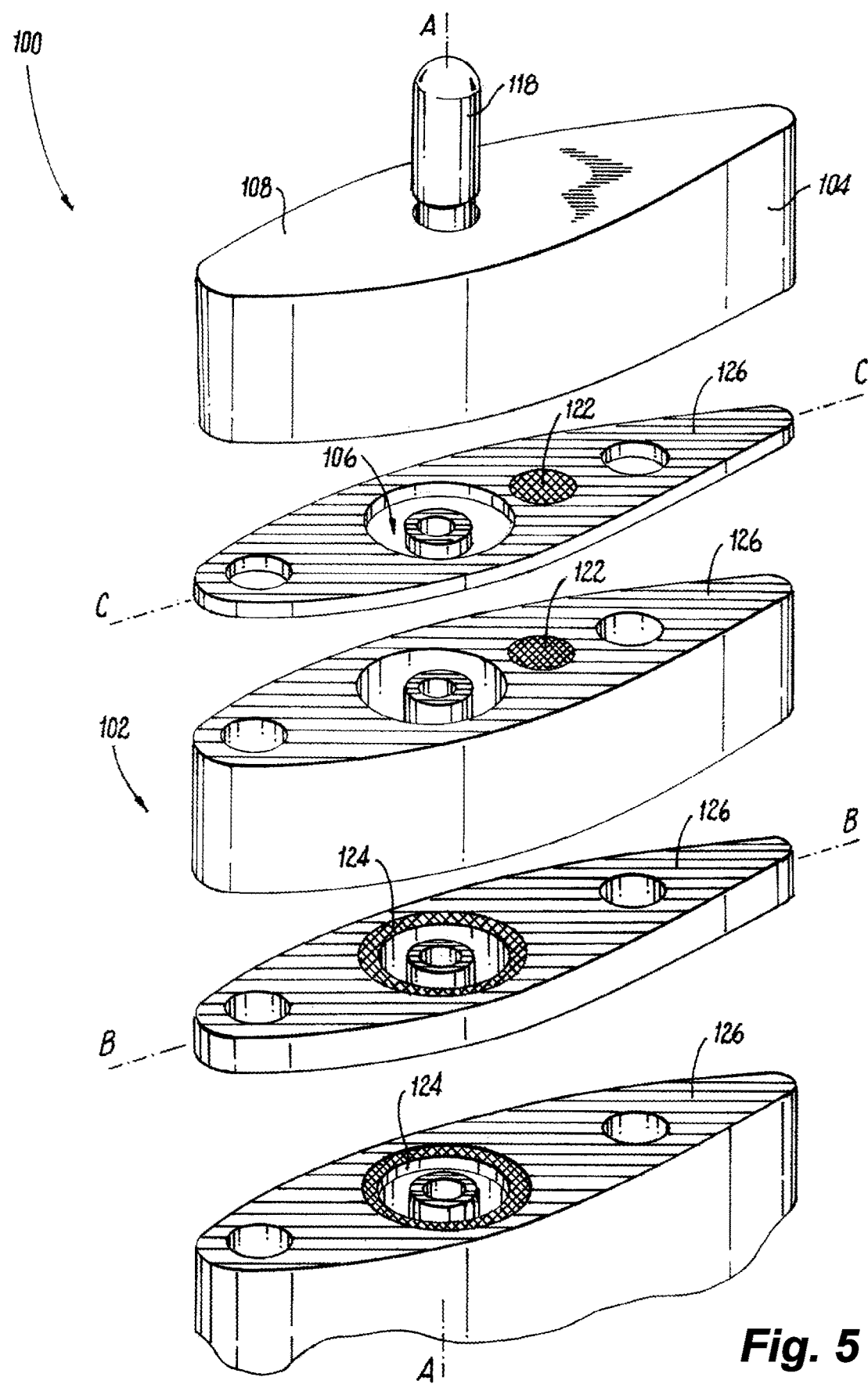
FIG. 5 is an exploded schematic view of the strut of FIG. 2, showing layers of the strut that include both the base material and the PMG material in a given layer.
Figure 6:
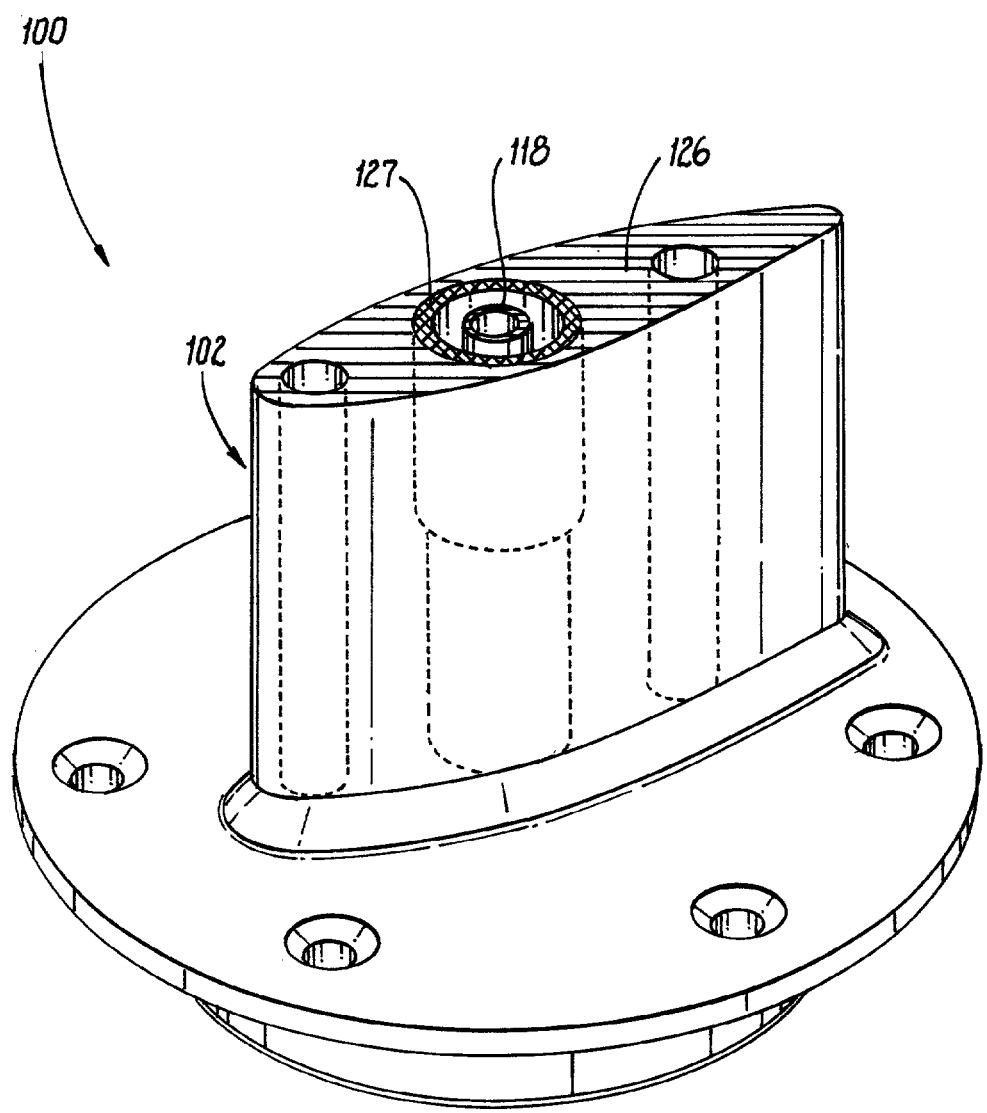
FIG. 6 is a cross-sectional perspective view of the strut of FIG. 1 with the PMG of FIG. 4.

With reference now to FIG. 3, a method of making an ice detection sensor apparatus 100 includes additively manufacturing a strut 102 of a base material with an integrated first permanent magnet (PMG) 122 and an integrated second PMG 124. The base material, first PMG, and second PMG are formed together layer by layer, e.g. where two of the layers labeled B and C are shown individually separated from the other layers of the strut 102 in FIG. 3. In forming the base material 126, first PMG 122, and second PMG 124 layer by layer, at least some layers, e.g. layers B and C in FIG. 3, also identified in FIG. 2, include both PMG material and the base material 126 together, integral with one another in the same layer. The base material 126, the first PMG 122, and the second PMG 124 are all formed monolithic with one another at the completion of the additive manufacturing. With reference to FIG. 2, the method includes assembling the magneto strictive oscillator sensing element 118, the oscillation driver 114, and the oscillation detector 116 into the interior space 106 of the strut 102 with a portion of the sensing element 118 extending through the strut to a space exterior of the strut 102. FIG. 6 shows a cross section of the strut 102 for the case where the PMG 127 of FIG. 4 is used, where the PMG 127 and base material 126 are monolithic with one another in the same layer of the cross-section.

Systems and methods as disclosed herein provide potential benefits including the following. The strength and uniformity of the permanent magnets have an effect on the oscillation of the sensing element. Forming the permanent magnets using an additive manufacturing process adds more precise control of the coupling regions relative to the traditional configurations. Other potential benefits also include reduction of parts for the assembly, i.e. a cost reduction both in cost of goods and manual labor installation.

The methods and systems of the present disclosure, as described above and shown in the drawings, provide for improved PMG fields in magneto strictive ice detection sensors relative to traditional configurations. While the apparatus and methods of the subject disclosure have been shown and described with reference to preferred embodiments, those skilled in the art will readily appreciate that changes and/or modifications may be made thereto without departing from the scope of the subject disclosure.

What is claimed is:

1. An ice detection sensor apparatus comprising:
   a strut body extending along a longitudinal axis, the strut body including an axially extending wall extending around the longitudinal axis to surround an interior space, and an axial-facing end wall connected to an axial end of the axially extending wall, wherein the axial-facing end wall partially bounds the interior space;
   a magneto strictive oscillator sensing element extending from the interior space, through the axial-facing end wall, wherein the magneto strictive oscillator sensing element is engaged to the axial-facing end wall for oscillation along the longitudinal axis relative to the axial-facing end wall;
   an oscillation driver within the interior space operatively connected to the magneto strictive oscillator sensing element to drive oscillation of the magneto strictive oscillator sensing element;
   an oscillation detector within the interior space, operatively connected to detect oscillation of the magneto strictive oscillator sensing element for ice detection; and
   a permanent magnet (PMG) element monolithic with the strut body, wherein the PMG element comprises:

a first permanent magnet (PMG) lateral from the magneto strictive oscillator sensing element relative to the longitudinal axis; and a second PMG concentric with the magneto strictive oscillator sensing element relative to the longitudinal axis.

2. The ice detection sensor apparatus as recited in claim 1, wherein the PMG element is concentric with the magneto strictive oscillator sensing element, and extends along a majority of an axial length of the magneto strictive oscillator sensing element.

3. The ice detection sensor apparatus as recited in claim 1, wherein the axially extending wall, the axially-facing end wall, the first PMG, and the second PMG are all monolithic with one another.

4. The ice detection sensor apparatus as recited in claim 3, wherein the first PMG extends along a greater axial extent of the magneto strictive oscillator sensing element than does the second PMG.

5. The ice detection sensor apparatus as recited in claim 1, wherein the first PMG is cylindrical and extends longitudinally parallel to the longitudinal axis.

6. The ice detection sensor apparatus as recited in claim 1, wherein the second PMG is in an annular cylinder shape axially aligned and concentric with the magneto strictive oscillator sensing element.

7. The ice detection sensor apparatus as recited in claim 1, further comprising a spring operatively connected to an end of the magneto strictive oscillator sensing element inside the interior space, wherein the spring is configured to bias the magneto strictive oscillator sensing element during oscillations of the magneto strictive oscillator sensing element.

8. The ice detection sensor apparatus as recited in claim 1, further comprising a base connected to the strut body and enclosing the interior space in cooperation with the axially extending wall and with the axially-facing end wall, wherein the base houses a controller operatively connected to the oscillation driver and to the oscillation detector for detecting ice formation on the magneto strictive oscillator sensing element and outputting data indicative of icing state of the magneto strictive oscillator sensing element.

9. The ice detection sensor apparatus as recited in claim 1, wherein the strut body is of aluminum.

10. The ice detection sensor apparatus as recited in claim 8, wherein the PMG element is of rare earth magnetic material.

11. A method of making an ice detection sensor apparatus comprising:

additively manufacturing a strut body of a base material with an integrated permanent magnet (PMG) element, wherein the PMG element comprises:

a first permanent magnet (PMG) lateral from the magneto strictive oscillator sensing element relative to the longitudinal axis; and a second PMG concentric with the magneto strictive oscillator sensing element relative to the longitudinal axis;

forming the base material and PMG element layer by layer to form the strut body of the base material with the PMG element;

operatively connecting an oscillation driver to the magneto strictive oscillator sensing element to drive oscillation of the magneto strictive oscillator sensing element; and operatively connecting an oscillation detector to the magneto strictive oscillator sensing element to detect oscillation of the magneto strictive oscillator sensing element for ice detection in an interior space of the strut body with a portion of the magneto strictive oscillator sensing element extending through the strut body to a space exterior of the strut body.

12. The method of making an ice detection sensor apparatus as recited in claim 11, wherein in forming the base material and PMG element layer by layer, at least some layers include both PMG material and the base material together.

13. The method of making an ice detection sensor apparatus as recited in claim 11, wherein the base material is a non-ferromagnetic metal.

14. The method of making an ice detection sensor apparatus as recited in claim 13, wherein the base material is aluminum.

* * * * *